United States Patent
Ratnakar et al.

(10) Patent No.: US 12,464,058 B2
(45) Date of Patent: Nov. 4, 2025

(54) UTILIZATION OF VISIBILITY FEATURE TO OBTAIN AND INCORPORATE DROP REASONS INTO MIRROR ON DROP REPORTS

(71) Applicant: Arista Networks, Inc., Santa Clara, CA (US)

(72) Inventors: Padmanabh Ratnakar, Karnataka (IN); Piyush Lodhi, Uttar Pradesh (IN); Sahil Midha, Uttar Pradesh (IN); Rohit Shukla, Uttar Pradesh (IN); Petr Budnik, Burnaby (CA); Abdul Haseeb Jehangir, Surrey (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/400,684

(22) Filed: Dec. 29, 2023

(65) Prior Publication Data
US 2025/0220091 A1    Jul. 3, 2025

(51) Int. Cl.
*G06F 15/173* (2006.01)
*H04L 43/0829* (2022.01)
*H04L 69/22* (2022.01)

(52) U.S. Cl.
CPC .......... *H04L 69/22* (2013.01); *H04L 43/0829* (2013.01)

(58) Field of Classification Search
CPC .................... H04L 69/22; H04L 43/0829
See application file for complete search history.

(56) References Cited

U.S. PATENT DOCUMENTS

| | | | |
|---|---|---|---|
| 11,075,847 B1 * | 7/2021 | Kwan | H04L 47/33 |
| 2020/0344143 A1 * | 10/2020 | K | H04L 49/3063 |
| 2024/0015051 A1 * | 1/2024 | Ameling | H04L 12/5601 |
| 2025/0007809 A1 * | 1/2025 | Liu | H04L 43/10 |

* cited by examiner

*Primary Examiner* — Duyen M Doan
(74) *Attorney, Agent, or Firm* — Sprinkle IP Law Group

(57) ABSTRACT

Systems and methods in which a network switch detects a dropped packet and automatically generates a report with information on the dropped packet. Additionally, a visibility packet that includes the dropped packet and one or more additional headers is generated. The headers are used to route the visibility packet to the pipeline of the network switch that originally processed the dropped packet. The headers also include a visibility indicator that causes the pipeline to store visibility data. As the visibility packet is processed by the pipeline, information (visibility data) generated during the processing of the packet is stored in a visibility memory. The visibility data is retrieved from the visibility memory and added to the generated report prior to transmitting the report to an external collector for analysis of the packet drop.

20 Claims, 5 Drawing Sheets

UTILIZATION OF VISIBILITY FEATURE TO OBTAIN AND INCORPORATE DROP REASONS INTO MIRROR ON DROP REPORTS

TECHNICAL FIELD

The disclosed embodiments relate generally to network devices, and more particularly to systems and methods for obtaining data on dropped packets.

BACKGROUND

In order to transmit data through a network, the data is encapsulated in packets and the packets are forwarded from one network switch to another as they traverse the network from a source to a destination. When a given network switch handles a packet, it normally receives the packet from a preceding switch, processes the packet, and forwards the packet to the next switch. Occasionally, one of the network switches drops a packet. When this occurs, it is common for some information related to the dropped packet to be collected and provided to a network administrator, who can then use the information to take corrective actions to optimize network performance.

Mirror-on-Drop (MOD) is a feature that enables information related to a dropped packet to be collected. Specifically, when a packet is dropped, MOD captures a portion of the dropped packet (for example, the first 80 bytes may be captured, although this may vary from one platform to another), along with its timestamp, and transmits this information in a suitable encapsulation format (e.g., a user datagram protocol data frame) to a pre-configured external collector. While this information is useful, it is also limited in some chips, and does not include additional information that would be helpful to, for example, diagnose the cause of the dropped packet.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
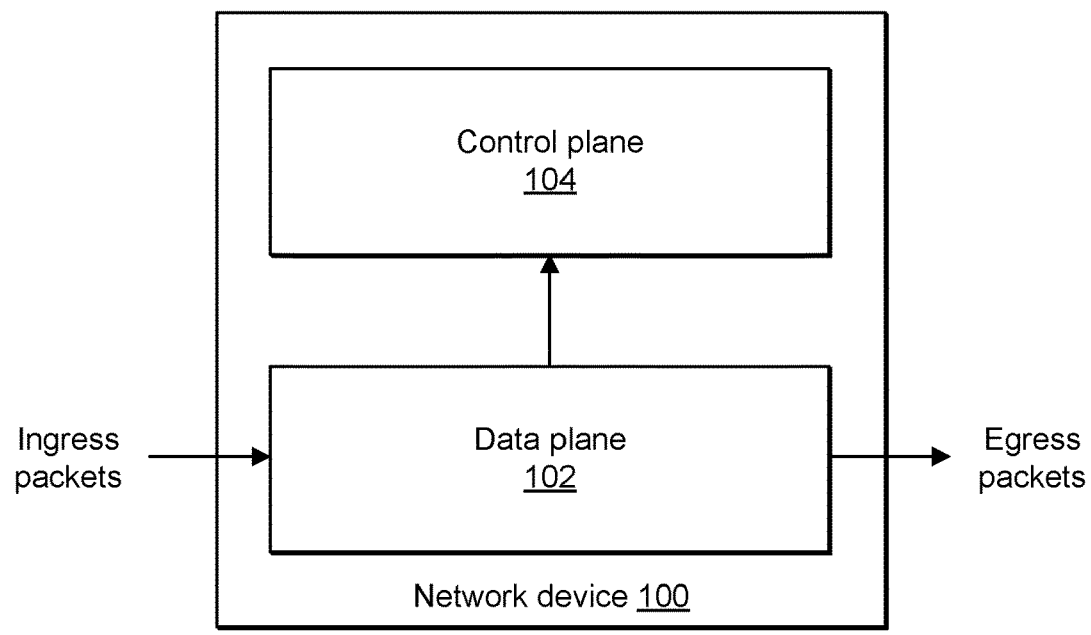
FIG. 1 is a block diagram illustrating the control and data planes of a network switch in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

When data is transmitted through a network, one or more of the packets encapsulating the data may be dropped. The MOD mechanism, which is available in existing systems, provides one way to obtain some information about the dropped packets. When a flow of packets is dropped in a system that uses the MOD mechanism, a portion of the initial dropped packet is captured, along with its timestamp. The captured data and timestamp of the initial packet are transmitted to a pre-configured external collector of the data. This information may be transmitted to the external collector in any suitable protocol or format, such as a User Datagram Protocol (UDP) frame, a Sampled Flow (sflow) frame, an Internet Protocol Flow Information Export (IPFIX) frame, or the like.

This external collector may perform one or more analyses to determine the cause of the dropped packet (or flow of packets). The external collector may alternatively provide the collected data to another device or system, which can then perform one or more analyses to determine the cause of the dropped packet(s). The external collector or other device/system may also be configured to use the collected information or the results of the analyses as the basis for taking corrective actions to reduce the likelihood of further packets being dropped, or otherwise optimizing network performance.

It should be noted that the MOD mechanism is only one possible mechanism for obtaining information about the reasons for a packet or packet flow having been dropped. For purposes of brevity and clarity, the following description will focus on the example of the MOD mechanism in the explanation of the disclosed embodiments. Since MOD is used as an example of the possible mechanisms for collecting information on dropped packets, references herein to MOD are exemplary, and references to MOD should be construed to include alternative mechanisms for collecting information on dropped packets.

Example embodiments disclosed herein make use of MOD, as well as another existing feature—a CPU visibility feature—to obtain additional information relating to the dropped packet. The CPU visibility feature allows a trace packet to be generated and injected into a pipeline of a network switch to obtain information associated with the processing of the packet through the pipeline. While the CPU visibility feature is an existing feature, it has not previously been used in connection with the MOD feature to automatically obtain information related to the processing of a dropped packet.

In some of the disclosed embodiments, when a packet is dropped, the CPU of the network switch triggers the MOD feature to collect an initial set of information relating to the dropped packet and to generate a report for reporting this information to an external collector. In some embodiments, the collected information includes a portion of the dropped packet (e.g., the first 80 bytes of the packet), as well as a timestamp for the dropped packet and a reason for the packet being dropped. The report is not immediately sent to the collector with this information because additional information generated by the reprocessing of the information with the CPU visibility feature will be appended to the report before sending it to the external collector.

The network switch uses the CPU visibility feature to construct a visibility packet from a dropped packet (i.e., by adding visibility headers to the dropped packet so that it can be reprocessed by the same pipeline as when the packet was dropped. In some embodiments, one of the headers identifies the ingress pipeline that originally processed the dropped packet. In some embodiments, one of the headers has a visibility indicator (e.g., a bit or other flag) which is set to indicate that information associated with the processing of the packet should be collected. The visibility packet is then reprocessed by sending it through a port back into the original ingress pipeline that processed the dropped packet.

It should be noted that the CPU visibility feature is only one possible mechanism for reprocessing a packet that has been dropped in order to obtain additional information relating to the dropping of the packet. For purposes of brevity and clarity, the description below will focus on the example of the CPU visibility mechanism in the explanation of the disclosed embodiments. Since CPU visibility is used as an example of the possible mechanisms for reprocessing packets, references herein to CPU visibility should be construed to include alternative mechanisms for reprocessing dropped packets.

As the packet passes through the pipeline, the visibility indicator is recognized, and ingress processing information and drop reasons are collected and stored in special visibility registers. The visibility registers are dedicated registers that are provided specifically for the purpose of storing information relating to the processing of the packet. If a packet is processed without a corresponding visibility indicator having been set, the same processing-related information may be generated, but this information is used in the processing of the packet, but is discarded after use, rather than being saved in the visibility registers. After a dropped packet has been reprocessed, the information stored in the visibility registers is read from the registers and is appended to the report which was initially generated by the MOD feature. After the additional information from the visibility registers has been appended to the report, the report is sent to the external collector for analysis.

Figure 2:
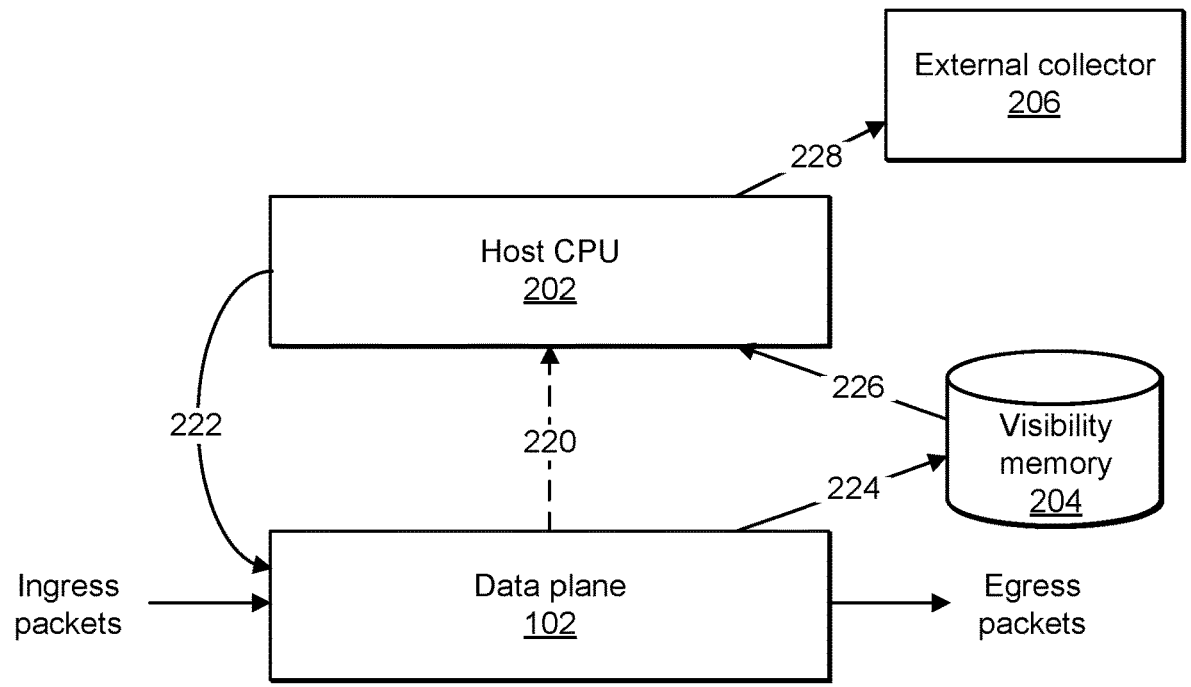
FIG. 2 is a diagram illustrating additional structure of a network switch in accordance with some embodiments.

FIGS. 1-2 show some of the relevant components of an exemplary system for obtaining information relating to the processing of a dropped packet in accordance with some embodiments.

FIG. 1 shows a network switch in accordance with some embodiments. Network switch 100 includes a data plane 102 and a control plane 104. The data plane includes functionality to receive packets (which may be referred to as ingress packets) via ingress ports of the switch. The network switch processes the packets and transmits the packets, as appropriate, via the egress ports towards a destination. The transmitted packets may be referred to as egress packets. Data plane 102 also functions to gather data plane information and to provide this data plane information to control plane 104. Data plane information may include, for example, network usage data, data flow information based on the sampling of packets received by the network switch, information related to queue depths on ingress and egress buffers in the data plane, and other data traffic statistics.

Control plane 104 includes functionality to manage the overall operation of the network switch, including functionality to manage the operation of the data plane (e.g., programming the forwarding table). The control plane may also include functionality to receive and respond to commands that are used to configure the network switch. Configuration information for the network switch is stored in a system database (SysDB) in control plane 104, and the configuration information is used to control the operation of the network switch, particularly with respect to the processing of received packets.

Referring to FIG. 2, a diagram is shown to illustrate additional structure of the network switch in accordance with some embodiments. As depicted in this figure, network switch 100 has a host CPU 202 which is part of control plane 104. Host CPU 202 is connected to the data plane 102 of the switch and controls the MOD and CPU visibility functions of the network switch.

When a packet processed by data plane 102 is dropped, host CPU 202 is notified of the dropped packet (indicated by dashed line 220). The dropped packet triggers the MOD mechanism, which obtains the first 80 bytes of the packet, a timestamp indicating the time at which the packet was processed/dropped, and a reason the packet was dropped, if available. Host CPU 202 generates a report that includes this information, but does not yet send the report to external collector 206.

In addition to triggering the MOD mechanism, the notification of the dropped packet causes host CPU 202 to generate a packet that is substantially the same as the dropped packet to be reprocessed by data plane 102 using the CPU visibility feature. This a dummy packet that may be referred to as a "visibility" packet. Host CPU 202 generates the visibility packet by adding headers to the dropped packet, where the headers allow the visibility packet to be routed 222 to a port of data plane 102 to be reprocessed. More particularly, the headers route the packet to the specific pipeline that originally processed the packet when it was dropped.

In this embodiment (which is illustrative, rather than limiting), the header used to route the packet to this pipeline is stripped before the packet is reprocessed. Another header which is retained during the reprocessing of the packet contains the visibility indicator that is recognized by data plane 102 and causes the data plane to store the processing-related information ("visibility data") generated when the packet is reprocessed. The visibility data (which would be discarded after use if the visibility indicator were not set) is stored 224 by data plane 102 in a memory 204 (e.g., a set of "visibility" registers). After the packet is reprocessed, it is discarded.

After the visibility data has been stored in memory 204, this information can be accessed and retrieved 226 from the memory by host CPU 202. Host CPU 202 uses the visibility data to augment the report that was initially generated by the MOD mechanism in response to the dropped packet. This may include adding some of the retrieved visibility data to the report, or using the visibility data to generate additional information that can be added to the report. After host CPU 202 has augmented the initial report using the visibility data, the report is transmitted 228 to external collector 206. External collector 206 can then analyze the information in the report for purposes such as determining the cause of the dropped packet, determining actions that may be taken to prevent further dropped packets, determining how the performance of the network may be improved, etc.

Figure 3:
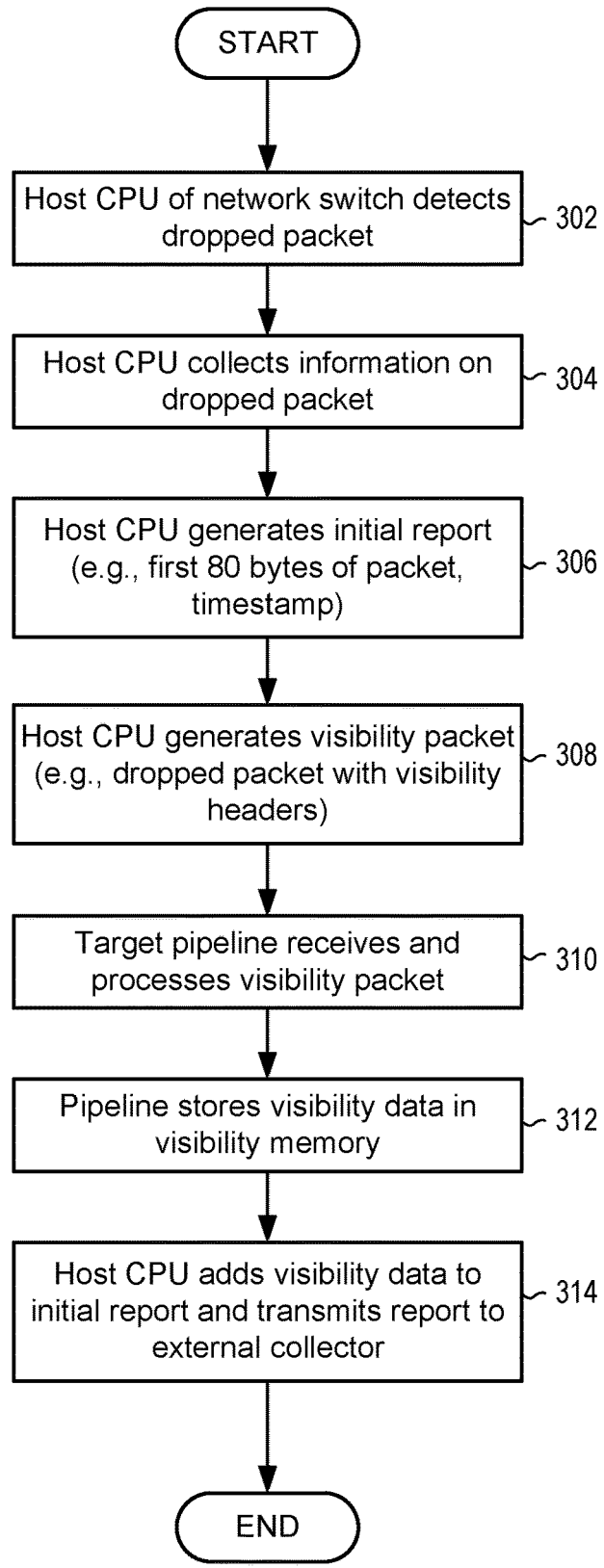
FIG. 3 is a flow diagram illustrating a method for collecting and reporting information relating to a dropped packet in accordance with some embodiments.

Referring to FIG. 3, a flow diagram is shown to illustrate a method for automatically collecting and reporting information relating to a dropped packet in accordance with some embodiments. The method is implemented in a network switch. At step 302, a dropped data packet is detected by the host CPU of the network switch. At step 304, the detection of the dropped packet triggers the collection of information on the packet. In some embodiments, the collection of the data may be performed using an MOD feature of the switch. At step 306, the host CPU generates an initial report on the dropped packet. The report is held to allow additional information on the dropped packet to be collected.

At step 308, the host CPU generates a visibility packet. The visibility packet includes headers to cause the packet to be routed to the port of the network switch's data plane and reprocessed by the pipeline that originally processed the dropped packet. At step 310, the visibility packet is reprocessed by this pipeline. At step 312, the data plane collects information associated with the reprocessing of the visibility packet. The collection of the information is triggered by a visibility indicator that is set in the headers of the visibility packet. The collected reprocessing information is stored in memory (e.g., dedicated registers) that are provided for this information. At step 314, the collected reprocessing information is retrieved from the memory by the host CPU and is appended (or is used to generate additional information that is appended) to the previously generated report on the dropped packet, and the appended report is forwarded to an external collector.

Additional details of some of the steps of FIG. 3 are described below in connection with FIGS. 4-9.

Figure 4:
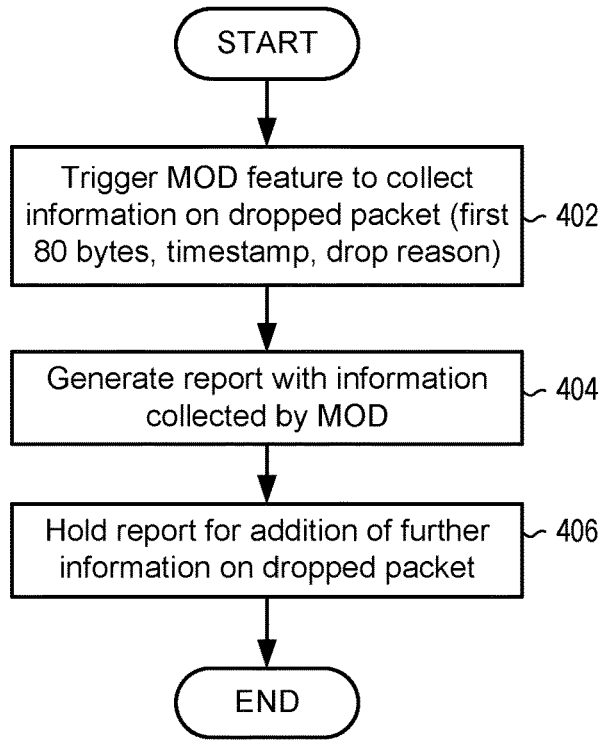
FIG. 4 is a flow diagram illustrating the collection of data on a dropped packet in accordance with some embodiments.

Referring to FIG. 4, a flow diagram is shown to illustrate the collection of data on a dropped packet in accordance with some embodiments. This method may be used to implement the collection of information in step 304 of FIG. 3. The method of FIG. 4 is implemented in a network switch that implements the MOD feature. At step 402, the detection of the dropped packet triggers the MOD feature, which collects specific information relating to the dropped packet. In particular, the information collected by the MOD feature includes: the first 80 bytes of the dropped packet; a timestamp identifying the time at which the packet was dropped; and a drop reason. At step 404, the host CPU generates a report on the dropped packet. In some embodiments, this report is the same report that is generated conventionally by the MOD mechanism. At step 406, however, the generated report is held rather than transmitting the standard MOD report to the external collector.

Step 406 of FIG. 4 is in contrast to conventional MOD methods, in which the generated report containing the limited information captured specifically by the MOD mechanism is transmitted to the external collector without augmenting the report to include visibility data (which is obtained in the disclosed embodiments by reprocessing the dropped packet using the CPU visibility feature with a visibility indicator set).

Figure 5:
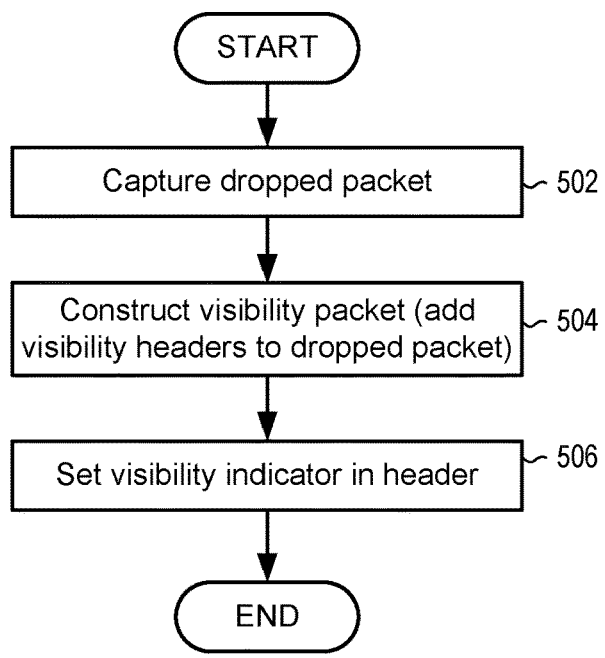
FIG. 5 is a flow diagram illustrating the generation of a visibility packet in accordance with some embodiments.
Figure 6:
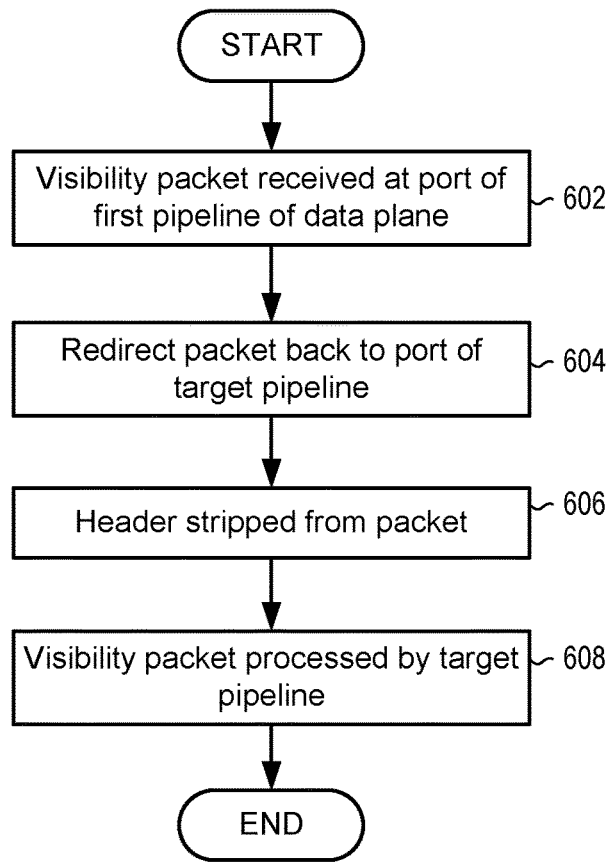
FIG. 6 is a flow diagram illustrating the processing of a visibility packet by the data plane of a network switch in accordance with some embodiments.
Figure 7:
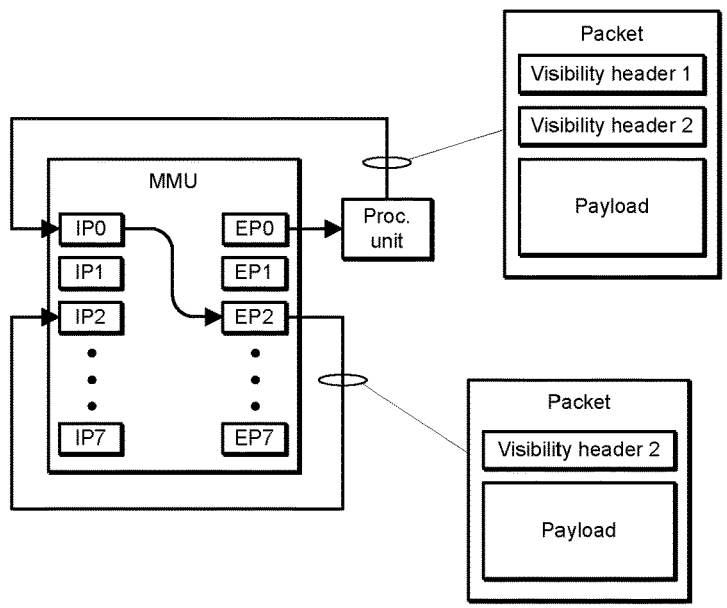
FIG. 7 is a diagram illustrating the routing of the visibility packet through the data plane in accordance with some embodiments.

FIGS. 5-7 are flow diagrams illustrating more detailed methods that may be used to perform steps 308, 310 and 312 of FIG. 3.

Referring to FIG. 5, a flow diagram is shown to illustrate the generation of a visibility packet in accordance with some embodiments. This method could be used to implement step 308 of FIG. 3 in some embodiments. This method is provided as an example, and alternative embodiments implemented in other types of chips may be different.

At step 502, the host CPU captures the dropped packet. The host CPU captures the entire dropped packet, rather than only the first 80 bytes of the packet as done by the conventional MOD mechanism, since it is desired to examine the reprocessing of the dropped packet. At step 504, the host CPU adds headers to the dropped packet. More specifically, the host CPU adds one or more visibility headers that may, for example, identify the packet as being sent from the CPU and identify a local destination port. The visibility headers enable recognition of the packet as a CPU visibility packet and cause the visibility data to be stored, otherwise treating the visibility packet as a typical packet that had arrived on the port identified in the visibility header.

At step 506, the visibility indicator in the header is set. This step may be a part of step 504, in which the headers are added to the visibility packet. In some embodiments, the visibility indicator is a single bit (a visibility bit) in the header that is set to "1" to indicate that visibility data is to be stored in corresponding visibility registers when the packet is reprocessed, or is set to "0" to indicate that data generated during processing of the packet is to be used and discarded, rather than stored. In the disclosed embodiments, the visibility bit in the header will always be set so that the visibility data will be retained in the visibility registers.

Referring to FIG. 6, a flow diagram is shown to illustrate the processing of a visibility packet by the data plane of a network switch in accordance with some embodiments. This method could be used to implement step 310 of FIG. 3 in some embodiments. At step 602, the visibility packet is received by a first port of the data plane (e.g., port 0). At step 604, the visibility packet is redirected to a port of a target pipeline which is the pipeline that originally processed the dropped packet. At step 606, a first header that is no longer necessary is stripped from the visibility packet. Then, at step 608, the visibility packet is processed by the target pipeline.

Referring to FIG. 7, a diagram is shown to illustrate the routing of the visibility packet through the data plane in accordance with some embodiments. As depicted in this figure, the dropped packet is provided from the egress port (EP0) of pipeline 0 to a processing unit which generates the visibility packet having the visibility headers. The packet is transported via the memory management unit (MMU) to an input port on the target pipeline (in this example, pipeline 2). A first visibility header is stripped from the visibility packet and the packet is provided to the target pipeline's input port.

After the packet reaches the port of the target pipeline, the packet is recognized as a visibility packet. Since the visibility bit in the header is set, the packet is treated as a visibility packet, so data generated during the processing of the packet will be stored in the visibility memory. The header is parsed, and the visibility packet is processed in the same manner as when it was originally processed, except that the visibility data will be stored. After the packet is processed, it is terminated (i.e., it is discarded, rather than being forwarded to another switch or destination).

In some embodiments, the visibility data may include, for example, VLAN processing information (from which a drop due to an unknown VLAN tagged packet, or an invalid VLAN can be inferred), L2 processing information, L3 processing information (from which a drop due to TTL=1, or a packet drop when the destination route is not configured can be inferred), ECMP processing information and LAG processing information.

Figure 8:
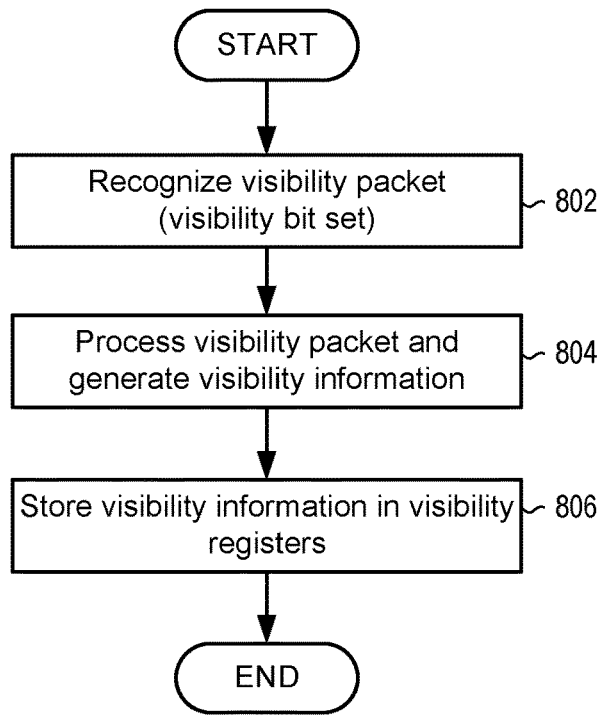
FIG. 8 is a flow diagram illustrating the collection of additional data on a dropped packet in accordance with some embodiments.

Referring to FIG. 8, a flow diagram is shown to illustrate the collection of additional data on a dropped packet in accordance with some embodiments. This method could be used in some embodiments to implement step 312 of FIG. 3. At step 802, the target pipeline recognizes that the packet is a visibility packet. At step 804, the target pipeline begins processing the visibility packet and generates information ("visibility" information) in the normal course of processing the packet. At step 806, the target pipeline stores the generated visibility information in a memory (e.g., visibility registers) designated for the storage of the visibility information. In some alternative embodiments, as the visibility packet is processed, the generated information may be directly output on a command line interface to a user.

Figure 9:
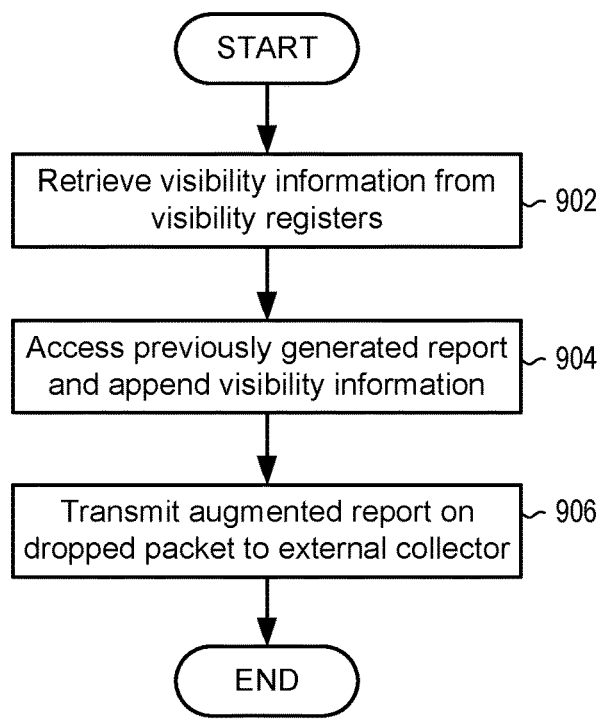
FIG. 9 is a flow diagram illustrating the reporting of data on a dropped packet in accordance with some embodiments.

Referring to FIG. 9, a flow diagram is shown to illustrate the reporting of data on a dropped packet in accordance with some embodiments. This method could be used in some embodiments to implement step 314 of FIG. 3. At step 902, the host CPU of the network switch retrieves the visibility data stored in the visibility memory (e.g., visibility registers). At step 904, the host CPU then accesses the report that was originally generated by the MOD mechanism and appends the visibility data to the report. The host CPU may alternatively add to the report information that is derived from the visibility data or generated based on the visibility data, but this may be more efficiently accomplished using other computing resources (e.g., those of the external collector). At step 906, the host CPU transmits the report, augmented with the visibility data stored during processing of the visibility packet, to the external collector. The external collector may take any appropriate action with respect to the received report, such as performing any suitable analyses of the information on the dropped packet, forwarding the data of the report to a user or otherwise making the data available to a user, or taking remedial action to reduce the likelihood of dropping further packets or improve the performance of the network. In some embodiments, the analyses provide information such as lookup status, packet resolution, STP state, forwarding fields, VLAN, L2, L3, lag, ECMP, drop reasons, etc., which can be appended to the MOD report.

One embodiment comprises a method that begins with detecting a dropped packet in a network switch. A visibility packet is then generated in the network switch, where the visibility packet includes the dropped packet and one or more additional headers. The visibility packet is then routed to a pipeline of the network switch that processed the dropped packet, and the visibility packet is processed in this pipeline. Processing information associated with the processing of the visibility packet is stored, and at least a portion of the stored processing information is provided to a dropped packet information collector external to the network switch.

In some embodiments, the additional headers are designed to allow the visibility packet to be routed back to a port where the visibility packet is processed as if the visibility packet was received as normal data traffic at the port identified in the headers.

In some embodiments, a report containing at least a portion of the dropped packet and a timestamp associated with the dropped packet is automatically generated in response to detecting the dropped packet. Further, at least a portion of the stored processing information is automatically added to this report, where the added portion of the processing information is non-duplicative of the portion of the dropped packet contained in the report.

In some embodiments, the processing information associated with the processing of the visibility packet is stored in response to a visibility flag being set in the visibility packet. The processing information associated with the processing of the visibility packet may be stored in a set of dedicated visibility registers. The processing of the visibility packet in the pipeline may include detecting the visibility flag and storing the processing information associated with the processing of the visibility packet in the set of visibility registers in response to detecting the visibility flag.

In some embodiments, the method includes terminating the visibility packet after processing the visibility packet in the pipeline. The visibility packet may be terminated in response to determining that a visibility indicator is set in the visibility packet. Alternatively, the visibility packet may be terminated in response to identifying the visibility packet based on a packet profile in the visibility packet headers.

An alternative embodiment comprises a network device comprising a host CPU, a data plane which is connected to the host CPU and configured to process received packets, and a visibility memory which is connected to the host CPU and the data plane. The host CPU is configured to, in response to detecting a dropped packet, generate a visibility packet which includes the dropped packet and one or more additional headers, where the additional headers include a set visibility indicator, and where the additional headers route the visibility packet to a pipeline of the data plane that processed the dropped packet. The pipeline is configured to process the visibility packet and, in response to detecting the set visibility indicator, store processing information associated with the processing of the visibility packet in the visibility memory which may comprise dedicated visibility registers. The host CPU is configured to retrieve the processing information stored in the visibility memory and provide at least a portion of the retrieved processing information to a dropped packet information collector which is external to the network device.

In some embodiments, the host CPU is configured to, in response to detecting the dropped packet, automatically generate a report using an MOD feature, the report containing at least a portion of the dropped packet and a timestamp associated with the dropped packet. The host CPU may be configured to add at least a portion of the processing information to this report. The portion of the processing information added to the report may be non-duplicative of the portion of the dropped packet contained in the report.

In some embodiments, the pipeline is configured to terminate the visibility packet after processing the visibility packet. The pipeline may be configured to terminate the visibility packet in response to determining that a visibility bit is set in the visibility packet. Alternatively, the pipeline may be configured to terminate the visibility packet in response to identifying the visibility packet based on a packet profile in a visibility header.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth herein.

What is claimed is:

1. A method comprising:
   detecting a dropped packet in a network switch, wherein the dropped packet was dropped by a pipeline;
   generating in the network switch a visibility packet which includes the dropped packet dropped by the pipeline and one or more additional headers;
   routing the visibility packet to the pipeline of the network switch that processed and dropped the dropped packet;
   processing the visibility packet in the pipeline that dropped the dropped packet;
   storing processing information associated with the processing of the visibility packet by the pipeline that dropped the dropped packet; and
   providing at least a portion of the stored processing information to a dropped packet information collector.

2. The method of claim 1, wherein the one or more additional headers comprise at least a first header containing information to redirect the visibility packet to an input port of the pipeline, the method further comprising routing the visibility packet to the input port using the first header and processing the visibility packet as if the visibility packet was traffic initially received at the input port identified in the first header.

3. The method of claim 1, further comprising, in response to detecting the dropped packet, automatically generating a report containing at least a portion of the dropped packet and a timestamp associated with the dropped packet.

4. The method of claim 3, further comprising adding at least a portion of the processing information to the report.

5. The method of claim 4, wherein the portion of the processing information added to the report is non-duplicative of the portion of the dropped packet contained in the report.

6. The method of claim 1, wherein the processing information associated with the processing of the visibility packet is stored in response to a visibility flag being set in the visibility packet.

7. The method of claim 6, wherein the processing information associated with the processing of the visibility packet is stored in a set of visibility registers.

8. The method of claim 1, wherein a visibility flag is set in the visibility packet, wherein processing the visibility packet in the pipeline includes detecting the visibility flag and storing the processing information associated with the processing of the visibility packet in the set of visibility registers in response to detecting the visibility flag.

9. The method of claim 1, further comprising, after processing the visibility packet in the pipeline, terminating the visibility packet.

10. The method of claim 9, wherein the visibility packet is terminated in response to determining that a visibility bit is set in the visibility packet.

11. The method of claim 9, wherein the visibility packet is terminated in response to identifying the visibility packet based on a packet profile in a visibility header.

12. A network device comprising:
   a host CPU;
   a data plane connected to the host CPU and configured to process received packets;
   a visibility memory connected to the host CPU and the data plane;
   wherein the host CPU is configured to, in response to detecting a dropped packet dropped by a pipeline of the data plane, generate a visibility packet which includes the dropped packet and one or more additional headers, the one or more additional headers including a set visibility indicator, and route the visibility packet to the pipeline of the data plane that processed and dropped the dropped packet;
   wherein the pipeline that dropped the dropped packet is configured to process the visibility packet and, in response to detecting the set visibility indicator, store processing information associated with the processing of the visibility packet by the pipeline in the visibility memory; and
   wherein the host CPU is configured to retrieve the processing information stored in the visibility memory and provide at least a portion of the retrieved processing information to a dropped packet information collector external to the network device.

13. The network device of claim 12, wherein the one or more additional headers comprise a first header, wherein the host CPU is configured to route the visibility packet to an input port of the pipeline using the first header, and wherein the pipeline is configured to process the visibility packet as if the visibility packet was traffic initially received at the input port identified in the first header.

14. The network device of claim 12, wherein the host CPU is configured to, in response to detecting the dropped packet, automatically generate a report containing at least a portion of the dropped packet and a timestamp associated with the dropped packet.

15. The network device of claim 14, wherein the host CPU is configured to add at least a portion of the processing information to the report.

16. The network device of claim 15, wherein the portion of the processing information added to the report is non-duplicative of the portion of the dropped packet contained in the report.

17. The network device of claim 12, wherein the processing information associated with the processing of the visibility packet is stored in a set of dedicated visibility registers.

18. The network device of claim 12, wherein the pipeline is configured to terminate the visibility packet after processing the visibility packet.

19. The network device of claim 18, wherein the pipeline is configured to terminate the visibility packet in response to determining that a visibility bit is set in the visibility packet.

20. The network device of claim 18, wherein the pipeline is configured to terminate the visibility packet in response to identifying the visibility packet based on a packet profile in a visibility header.

* * * * *